United States Patent [19]

Horikawa et al.

[11] Patent Number: 4,747,677

[45] Date of Patent: May 31, 1988

[54] LENS SYSTEM HAVING ABERRATIONS CORRECTED AT NEAR DISTANCE FOCUSING

[75] Inventors: Yoshiaki Horikawa; Toshihiro Imai; Yasuzi Ogata, all of Hachiouji, Japan

[73] Assignee: Olympus Optical Co., Ltd., Tokyo, Japan

[21] Appl. No.: 333,698

[22] Filed: Dec. 23, 1981

[30] Foreign Application Priority Data

Dec. 27, 1980 [JP] Japan .................................. 55-188793

[51] Int. Cl.$^4$ .............................. G02B 9/62; G02B 9/60
[52] U.S. Cl. ..................................... 350/464; 350/465
[58] Field of Search ............... 350/465, 464, 423, 463, 350/454–458

[56] References Cited

U.S. PATENT DOCUMENTS

| | | | |
|---|---|---|---|
| 3,883,228 | 5/1975 | Betensky | 350/464 X |
| 4,126,378 | 11/1978 | Ogino | 350/454 |
| 4,165,916 | 8/1979 | Nakamura | 350/464 |
| 4,198,127 | 4/1980 | Itoh | 350/454 X |
| 4,464,023 | 8/1984 | Kato et al. | 350/464 |

Primary Examiner—John K. Corbin
Assistant Examiner—Scott J. Sugarman
Attorney, Agent, or Firm—Cushman, Darby & Cushman

[57] ABSTRACT

A lens system comprising a front lens group consisting of a first, second and third lens components respectively of positive meniscus lenses with the convex surfaces on the object side and a fourth lens component of a negative meniscus lens and a rear lens group consisting of a fifth lens component of a positive or negative cemented meniscus lens with the convex surfaces on the image side and a sixth lens component of a positive lens. In this lens system, the entire lens system is moved along an optical axis to focus and an airspace between the fourth and fifth lens component and an airspace between the fifth and sixth lens components are respectively varied non-linearly to correct the collapse of aberrations. The front lens group may consist of a first lens component of a positive lens, a second lens component of a negative lens and a third lens component of a positive lens and the rear lens group may consist of a fourth lens component of a negative lens and a fifth lens component of a positive lens. In this case, an airspace between the third and fourth lens components and an airspace between the fourth and fifth lens components are respectively varied non-linearly to correct the collapse of aberrations.

4 Claims, 13 Drawing Sheets

LENS SYSTEM HAVING ABERRATIONS CORRECTED AT NEAR DISTANCE FOCUSING

BACKGROUND OF THE INVENTION (a) Field of the Invention

This invention relates to a lens system having a mechanism for correcting the collapse of aberrations in the case of focusing on a near distance object.

(b) Description of the Prior Art

Generally, in a photographic lens, various aberrations are corrected so as to be the best when the lens is focused on an infinite distance object. Therefore, the aberration state when the photographic lens is focused on a near distance object will be worse than the best state (the state at the time of the infinite distance).

A floating system is known as a means of preventing the deterioration of aberrations in the case of focusing a lens on such near distance object. In this system, a specific airspace in the lens system is selected and is varied, for example, with moving before the entire lens system in focusing the lens on a near distance object so as to correct the collapse of aberrations.

In this conventional system, the correction is made by linearly varying the above mentioned selected airspace with the variation of the distance from the lens to the object. Here the linear variation means such relation that, for example, when the infinite distance is varied to such distance that the magnification of the object may be 1/20, if the specific airspace is varied by Δd to correct the collapse of aberrations, the above mentioned airspace will be varied by 2Δd for such distance that the magnification of the object may be 1/10 and by 4Δd for such distance that the magnification of the object may be 1/5. Therefore, the action of correcting the collapse of aberrations is not always sufficient and particularly, when the lens is focused at a very near distance, the deterioration of the aberrations has not been able to be well corrected.

In this conventional floating system, the spherical aberration, astigmatism, offaxial lateral aberration and distortion are corrected by linearly varying, for example, one selected airspace but the variation rate of each of the spherical aberration, astigmatism, offaxial lateral aberration and others for the variation of the airspace when the amount of occurrence of the aberrations and airspace are varied is different. Therefore, one aberration can be corrected by linearly varying one airspace but several aberrations can be simultaneously corrected only in the case that the rate of the size of each of the above mentioned aberrations and the variation rate of the airspace are substantially equal. However, as described above, there are so few cases that the rate of the size of each aberration and the variation rate of the airspace are substantially equal that the floating system wherein one airspace is linearly varied is poor in the generality. Further, even in the case that two airspaces are made variable, the linearly varying lens movement as described above is also poor in the generality.

SUMMARY OF THE INVENTION

The present invention is to provide a lens system wherein, in view of the above mentioned points, the collapse of aberrations by focusing the lens system at a near distance is corrected by non-linearly varying at least one airspace in focusing the lens system.

In the case of linearly varying a specific airspace in a lens system as described above, the variation rate of the space of each aberration will be different and therefore, even if the collapse of one aberration can be corrected, it will be difficult to well balance and correct all aberrations.

According to the present invention, in the case of correcting the collapse of aberrations by varying a specific airspace in a lens system, the amount of the variation of the airspace is selected so that all the aberrations may be well balanced and corrected by considering the difference of the variation rate of each aberration. That is to say, the airspace is non-linearly varied in such manner that the difference of the variation rate of each aberration when the airspace is linearly varied may be corrected. The airspace to be varied in this may be one but, if two or more airspaces are selected so as to be simultaneously varied, it will be easier to correct the collapse of aberrations.

Generally, when a lens system designed so that various aberrations may be well corrected in an infinite distance is focused on an object at a near distance, the deterioration of the spherical aberration and astigmatism (curvature of field) will be particularly a problem. Therefore, it is necessary to make the above mentioned two aberrations favorable even when the system is focused on an object at a near distance. For example, two airspaces are made variable, the difference between the respective variation rates of the spherical aberration and astigmatism is utilized, the spherical aberration and astigmatism are kept at desired aberration amounts while considering the balance of the offaxial lateral aberration, the variation amount of the above mentioned airspace is made non-linear, thereby the overcorrection and undercorrection of the aberration produced by the variation of the delicate variation rate of each aberration with the variation of the photographing distance (magnification) can be overcome and the delicate aberration slip from the infinite distance to the near distance can be corrected as well balanced. Particularly, in the case of focusing the system on an object at a very near distance, if the balance of the general aberrations is considered, even if the spherical aberration and astigmatism are undercorrected more or less, if the deterioration of the offaxial lateral aberration and others is prevented, a favorable correction result will be obtained.

On the lens system of the present invention wherein the collapse of aberrations is corrected by making the variation of the airspace non-linear, the case that such two airspaces as are mentioned above are varied non-linearly shall be explained further in detail.

In such lens system having a positive refractive power in front and rear of a stop as of a Gauss type or modified Gauss type, up to such distance to an object as, for example, a distance to the object corresponding to a magnification of 1/20, the deterioration of aberrations is not so remarkable. However, about since the magnification exceeds 1/10, the deterioration of aberrations will become remarkable, the spherical aberration and astigmatism will be extremely undercorrected, the offaxial lateral aberration will also increase and the use with the stop aperture fully opened will become difficult. Some combinations of two airspaces adapted to correct aberrations in such lens system are thought of but, if the feature of the lens mechanism is considered, in fact, it will be most desirable to movably select an airspace just after a stop and an airspace just before a positive lens in a rear positive lens group. Further, from the point of the aberration correction, just after the stop, the degree of the convergence of rays is weak and will be weaker when the lens system is focused on a near distance object (one of the factors of requiring a non-linear system), further the height of ray is low and the axial ray and offaxial ray has the same height of ray. Therefore, the variation of the airspace just after the stop will contribute more to the correction of the spherical aberration than to the correction of the astigmatism. On the other hand, just before the positive lens in the rear group, the axial ray and offaxial are different in the height of ray and therefore contribute more to the correction of the astigmatism. Therefore, it is preferrable to select the above mentioned airspace.

DESCRIPTION OF THE PREFERRED EMBODIMENTS

Figure 1:
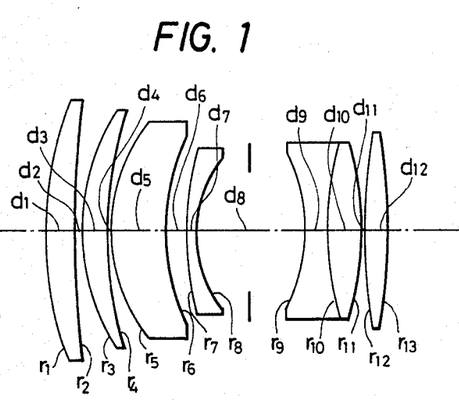
FIG. 1 is a sectional view showing a first embodiment of a lens system according to the present invention.

FIG. 1 shows a first embodiment of a lens system according to the present invention. This first embodiment is a lens system formed of a front lens group consisting of a first lens component, second lens component and third lens component respectively of positive meniscus lenses with the convex surfaces on the object side and a fourth lens component of a negative meniscus lens and a rear lens group consisting of a fifth lens component of a positive or negative cemented meniscus lens with the convex surface on the image side and a sixth lens component of a positive lens from the object side and having the following data, an airspace $d_8$ between the fourth lens component and fifth lens component and an airspace $d_{11}$ between the fifth lens component and sixth lens component being made variable to correct the collapse of aberrations:

| f = 1.0 F/2.0 | | |
|---|---|---|
| $r_1 = 0.6477$ | | |
| $d_1 = 0.0780$ | $n_1 = 1.6170$ | $\nu_1 = 62.8$ |
| $r_2 = 3.2938$ | | |
| $d_2 = 0.0040$ | | |
| $r_3 = 0.4539$ | | |
| $d_3 = 0.0562$ | $n_2 = 1.4970$ | $\nu_2 = 81.6$ |
| $r_4 = 0.8860$ | | |
| $d_4 = 0.0064$ | | |
| $r_5 = 0.3857$ | | |
| $d_5 = 0.1116$ | $n_3 = 1.6425$ | $\nu_3 = 58.4$ |
| $r_6 = 0.4485$ | | |
| $d_6 = 0.0432$ | | |
| $r_7 = 0.7022$ | | |
| $d_7 = 0.0197$ | $n_4 = 1.7552$ | $\nu_4 = 27.5$ |
| $r_8 = 0.2314$ | | |
| $d_8 = 0.2243$ (variable) | | |
| $r_9 = -0.3745$ | | |
| $d_9 = 0.0495$ | $n_5 = 1.5814$ | $\nu_5 = 40.8$ |
| $r_{10} = 0.6167$ | | |
| $d_{10} = 0.0777$ | $n_6 = 1.7440$ | $\nu_6 = 44.7$ |
| $r_{11} = -0.5743$ | | |
| $d_{11} = 0.0062$ (variable) | | |
| $r_{12} = 1.8142$ | | |
| $d_{12} = 0.0417$ | $n_7 = 1.6970$ | $\nu_7 = 48.5$ |
| $r_{13} = -1.1928$ | | |

AMOUNTS OF VARIATIONS OF AIRSPACES

| Magnification | $\Delta d_8$ | $\Delta d_{11}$ |
|---|---|---|
| $\frac{1}{20}$ | 0.0150 | 0.0100 |
| $\frac{1}{10}$ | 0.0142 | 0.0262 |
| $\frac{1}{5}$ | 0.000 | 0.0700 |

In the above mentioned data, the reference symbol f denotes a focal length of the entire system, $r_1$ through $r_{13}$ denotes radii of curvature of the respective surfaces of the lens components, $d_1$ through $d_{12}$ denote thickness and airspaces of the respective lens components, $n_1$ through $n_2$ denote refractive indices of the respective lens components and $\nu_1$ through $\nu_7$ denotes Abbe's numbers of the respective lens components.

By the way, in order that the effects of the present invention may be clear, the comparison of the aberration states in the case of lineraly moving as mentioned below only the airspace $d_{11}$ in the above mentioned lens system shall be described later.

| Magnification | $d_{11}$ |
|---|---|
| $\frac{1}{20}$ | 0.0150 |
| $\frac{1}{10}$ | 0.0300 |
| $\frac{1}{5}$ | 0.0600 |

Figure 2:
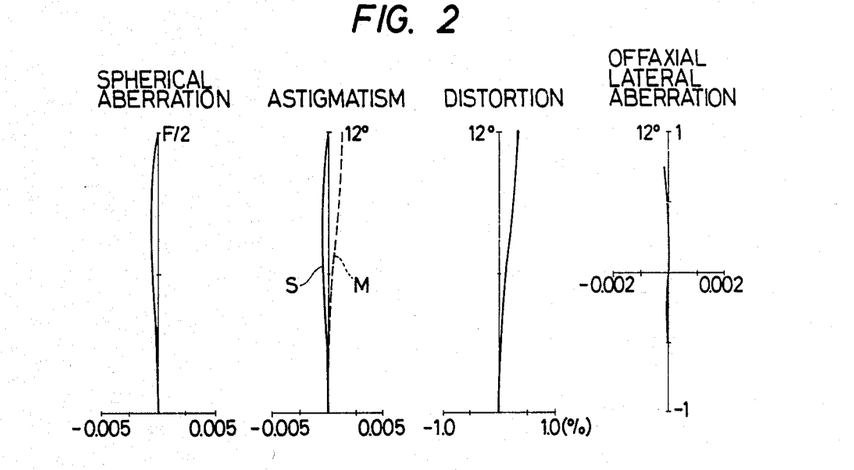
FIG. 2 is a curve diagram of respective aberrations in case the lens system is focused on an infinite distance object in the lens system in the first embodiment.
Figure 3:
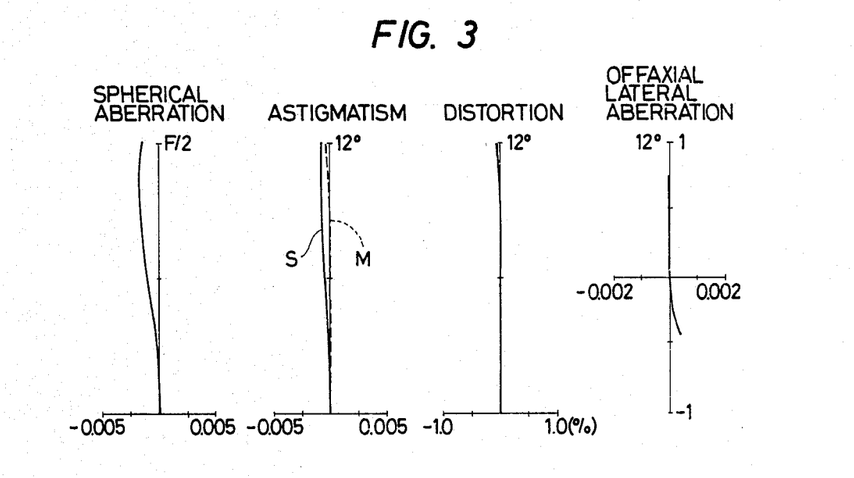
FIG. 3 is a curve diagram of respective aberrations in case the lens system is focused on an object at such distance that the magnification may be 1/20 by moving the entire lens system in the first embodiment.
Figure 4:
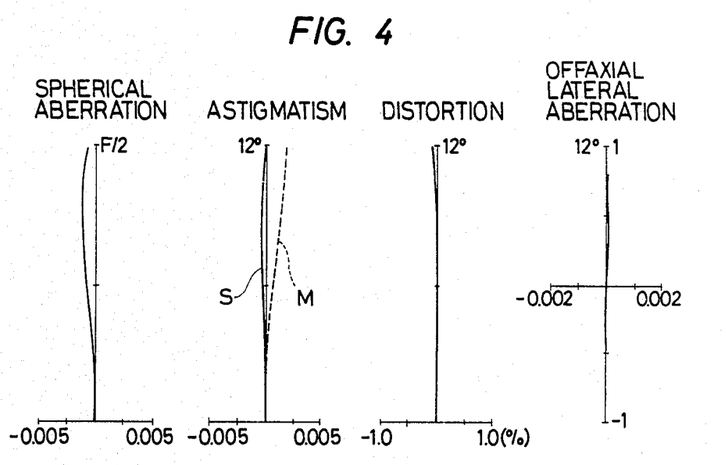
FIG. 4 is a curve diagram of respective aberrations in case the lens system is focused on an object at such distance that the magnification may be 1/20 be linearly varying an airspace in the lens system in the first embodiment.
Figure 5:
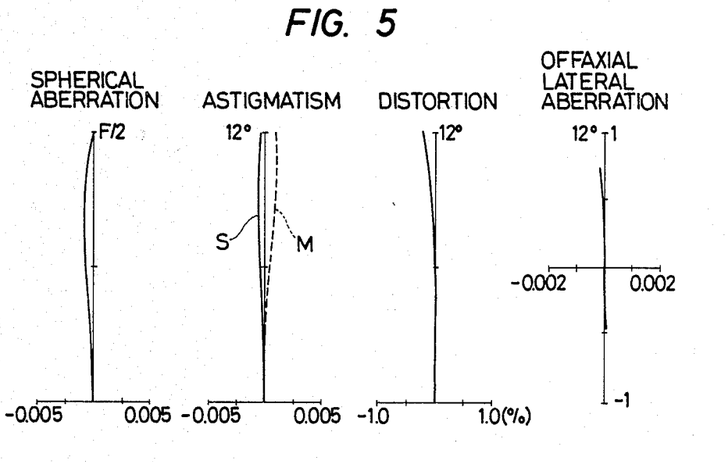
FIG. 5 is a curve diagram of respective aberrations in case the lens system is focused on an object at such distance that the magnification may be 1/20 by respectively non-linearly varying two airspaces in the lens system in the first embodiment.
Figure 6:
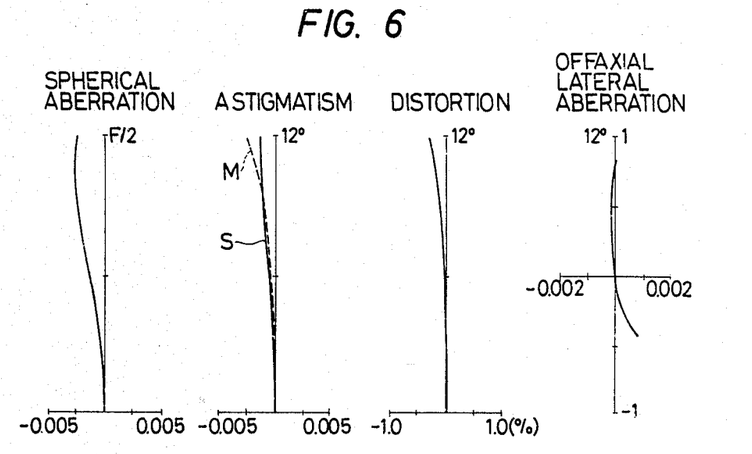
FIG. 6 is a curve diagram of respective aberrations in case the lens system is focused on an object at such distance that the magnification may be 1/20 by moving the entire lens system in the first embodiment.
Figure 7:
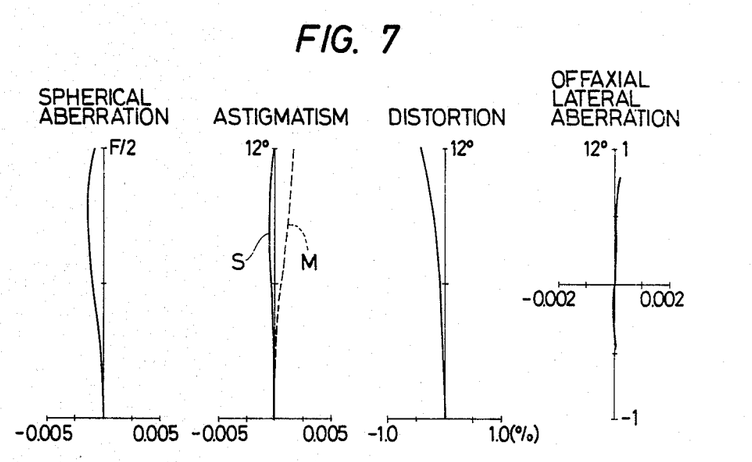
FIG. 7 is a curve diagram of respective aberrations in case the lens system is focused on an object at such distance that the magnification may be 1/10 by linearly varying an airspace in the lens system in the first embodiment.
Figure 8:
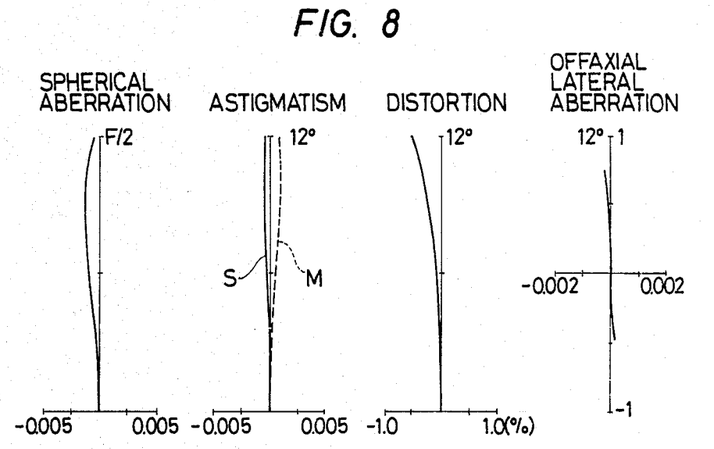
FIG. 8 is a curve diagram of respective aberrations in case the lens system is focused on an object at such distance that the magnification may be 1/10 by respectively non-linearly varying two airspaces in the lens system in the first embodiment.
Figure 9:
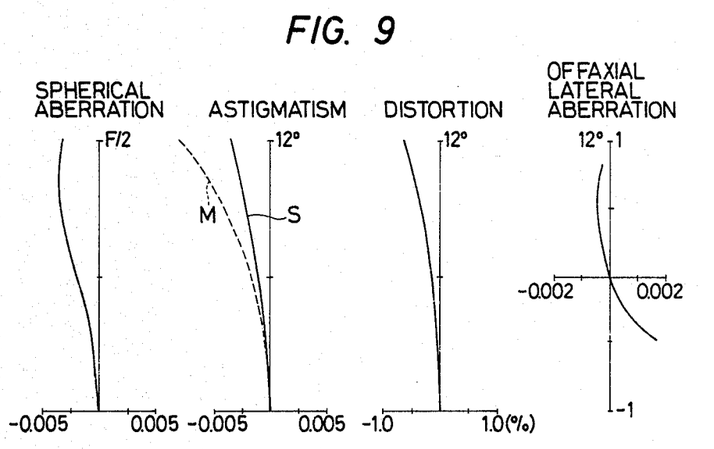
FIG. 9 is a curve diagram of respective aberrations in case the lens system is focused on an object at such distance that the magnification may be 1/5 by moving the entire lens system in the first embodiment.
Figure 10:
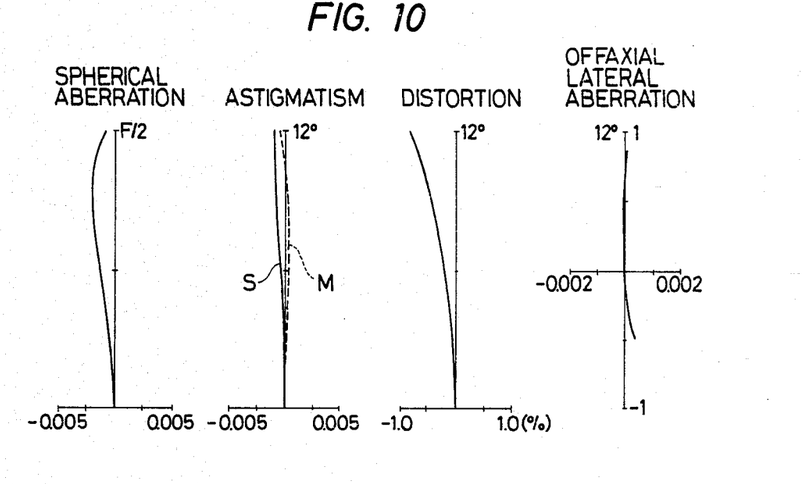
FIG. 10 is a curve diagram of respective aberrations in case the lens system is focused on an object at such distance that the magnification may be 1/5 by linearly varying an airspace in the lens system in the first embodiment.
Figure 11:
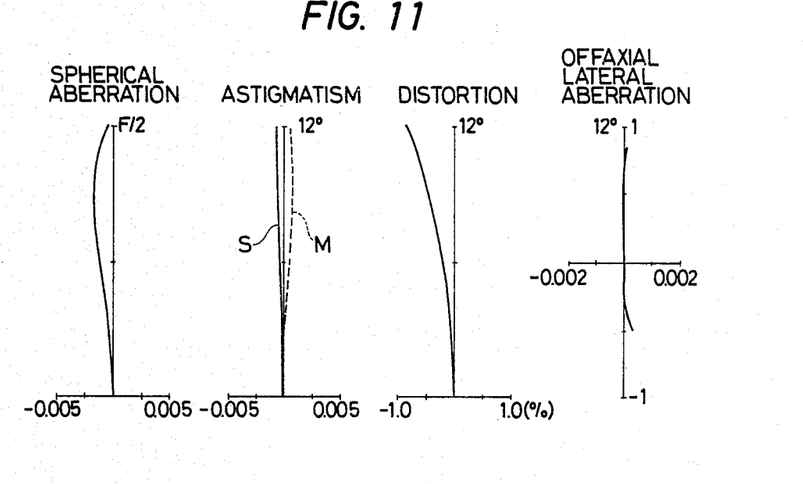
FIG. 11 is a curve diagram of respective aberrations in case the lens system is focused on an object at such distance that the magnification may be 1/5 by respectively non-linearly varying two airspaces in the lens system in the first embodiment.

The aberration states in the case of making no correction in the above mentioned lens system, of the correction by a linear movement and of the present invention are shown in FIGS. 2 to 11. Of these diagrams, FIG. 2 is of the case that the lens system is focused on an object at an infinite distance, FIG. 3 is of the case that the lens system is focused by paying out the entire lens system when the magnification is 1/20, FIG. 4 is of the case that aberrations are corrected by linearly varying the airspace $d_{11}$ and FIG. 5 is of the case of the present invention that aberrations are corrected by respectively non-linearly varying the airspaces $d_8$ and $d_{11}$. FIGS. 6, 7 and 8 are respectively of the cases at a magnification of 1/10 that the airspace is not varied, that the airspace $d_{11}$ linearly varied and that the airspaces $d_8$ and $d_{11}$ are non-linearly varied. Further, FIGS. 9, 10 and 11 are respectively of the cases at a magnification of 1/5 that no airspace is varied and that the airspaces $d_8$ and $d_{11}$ are non-linearly varied.

As clear from these diagrams, in the lens system having a correcting function according to the present invention, aberrations are well corrected at any magnification. By the way, in the example of linearly varying the airspace $d_{11}$, the displacement is so determined that the aberrations will be best when the magnification is 1/10. In such case, as shown in FIG. 7, the spherical aberration will be somewhat undercorrected and the astigmatism will be somewhat overcorrected. When the magnification is 1/20 as shown in FIG. 4, they will be the same but, when the magnification is 1/5 as shown in FIG. 10, the astigmatism will be undercorrected on the contrary. This is because the variation rates of the aberrations are remarkably and linearly varied. Thus, with the linear variation, it is difficult to correct both spherical aberration and astigmatism.

Figure 12:
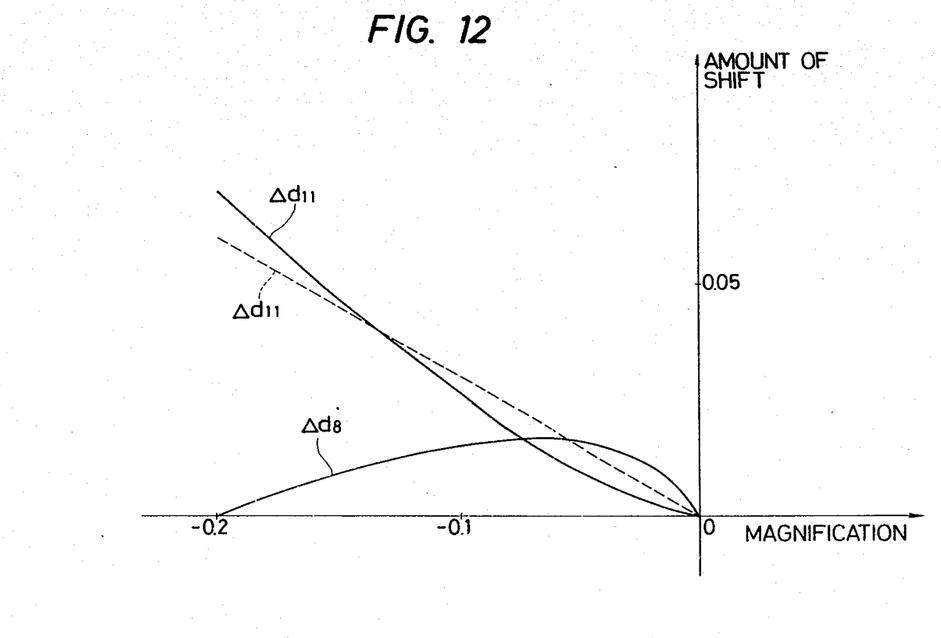
FIG. 12 is a view showing the amounts of the variations of the airspace in the first embodiment.

FIG. 12 shows the variation amounts of the airspace in the case of the floating, the solid line being of the present invention and the broken line being of the case that the airspace $d_{11}$ is linearly varied.

A lens system of a telescopic type shall be explained as an example in the following. In the lens system of the telescopic type, in the case of a near distance photographing, the deterioration of aberrations will not be so remarkable until the object distance corresponding to a magnification of 1/30. However, since the magnification exceeds about 1/10, the angle of field will be so small that the change of the astigmatism will be small but the deterioration of the spherical aberration and offaxial lateral aberration will become so remarkable as to cause the performance to be reduced. In the lens system of the telescopic type, the lens components forming the front lens group are so large that, when the structural problems are considered, it will be advantageous to select a combination of two airspaces adapted to correct aberrations from among the airspaces between the lens components forming the rear lens group. From the aberration correction, the ray incident upon the negative lens component just after the stop is so high in the converging degree that the incident angle of the axial ray is large and the amount of occurrence of the spherical aberration is large. However, the offaxial ray is so close to the stop as to be kept symmetrical and the amount of occurrence of the offaxial lateral aberration is small. Further, in the lens system of the telescopic type, as the vignette is determined on a surface far from the stop, in the negative lens component just after the stop, the height of the offaxial ray is well lower than that of the axial ray. For these reasons, in case the airspace just after the stop is varied, it will contribute more to the correction of the spherical aberration than to that of the offaxial lateral aberration. The axial ray subjected to the diverging action by the negative lens component will be so low in the converging degree that, in the positive lens component near the image side, the height of ray will become low and the amount of occurrence of the spherical aberration will become small. However, the offaxial ray will become so conspicuous in the asymmetricity that the amount of occurrence of the offaxial lateral aberration will be large. For these reasons, when the airspace just before the positive lens component near the image side is varied, it will contribute more to the correction of the offaxial lateral aberration than to that of the spherical aberration.

Figure 13:
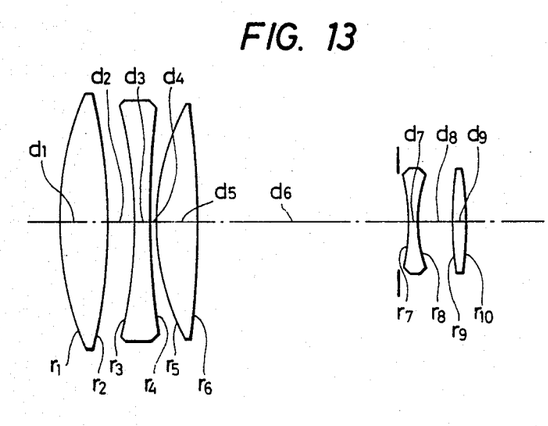
FIG. 13 is a sectional view showing a second embodiment of the lens system according to the present invention.

As a second embodiment, the formation of a lens system of a telescopic type based on the above reasons is shown in FIG. 13. That is to say, it is formed of a front group consisting of a first lens component of a positive lens, a second lens component of a negative lens and a third lens component of a positive lens and a rear group consisting of a fourth lens component of a negative lens and a fifth lens component of a positive lens from the object side, has an airspace $d_6$ between the third lens component and fourth lens component and an airspace $d_8$ between the fourth lens component and fifth lens component selected to be variable and has the following numerical data:

| f = 1.0  F/2.8 | | |
|---|---|---|
| $r_1 = 0.4554$ | | |
| $d_1 = 0.0648$ | $n_1 = 1.4970$ | $\nu_1 = 81.6$ |
| $r_2 = -0.8199$ | | |
| $d_2 = 0.0383$ | | |
| $r_3 = -0.6010$ | | |
| $d_3 = 0.0221$ | $n_2 = 1.7995$ | $\nu_2 = 42.2$ |
| $r_4 = 1.9918$ | | |
| $d_4 = 0.0094$ | | |
| $r_5 = 0.3461$ | | |
| $d_5 = 0.0530$ | $n_3 = 1.4970$ | $\nu_3 = 81.6$ |
| $r_6 = -2.1432$ | | |
| $d_6 = 0.2945$ (variable) | | |
| $r_7 = -0.2528$ | | |
| $d_7 = 0.0118$ | $n_4 = 1.4983$ | $\nu_4 = 65.0$ |
| $r_8 = 0.2091$ | | |
| $d_8 = 0.0471$ (variable) | | |
| $r_9 = 0.3721$ | | |
| $d_9 = 0.0177$ | $n_5 = 1.6141$ | $\nu_5 = 55.0$ |
| $r_{10} = -0.5505$ | | |

AMOUNTS OF VARIATIONS OF AIRSPACES
(when $d_6$ was non-linearly varied)

| Magnification | $\Delta d_6$ |
|---|---|
| $\frac{1}{30}$ | −0.0004 |
| $\frac{1}{10}$ | −0.0007 |
| $\frac{1}{5}$ | 0.0003 |

AMOUNTS OF VARIATIONS OF AIRSPACES
(when $d_6$ and $d_8$ were non-linearly varied)

| Magnification | $\Delta d_6$ | $\Delta d_8$ |
|---|---|---|
| $\frac{1}{30}$ | −0.0004 | 0.0029 |
| $\frac{1}{10}$ | −0.0012 | 0.0118 |
| $\frac{1}{5}$ | −0.0031 | 0.0177 |

Of the above mentioned data, the reference symbol f denotes a focal length of the entire system, $r_1$ through $r_{10}$ denote radii of curvature of the respective surfaces of the lens components, $d_1$ through $d_9$ denote thicknesses and airspaces of the respective lens components, $n_1$ through $n_5$ denote refractive indices of the respective lens components, and $\nu_1$ through $\nu_5$ denote Abbe's numbers of the respective lenses.

Figure 14:
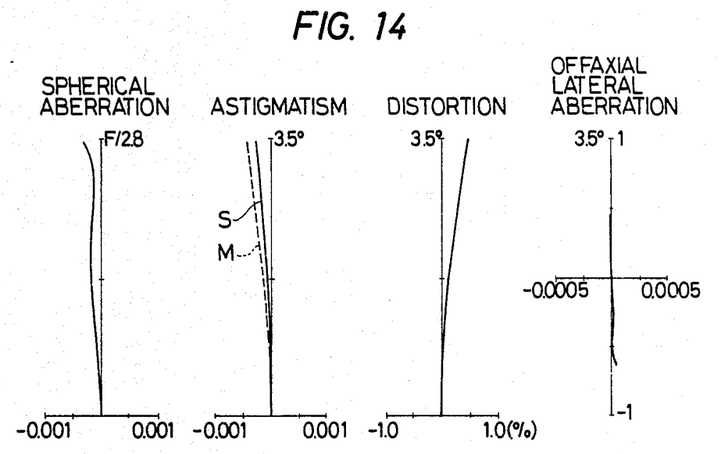
FIG. 14 is a curve diagram of respective aberrations in case the lens system is focused on an object at an infinite distance in the second embodiment.
Figure 15:
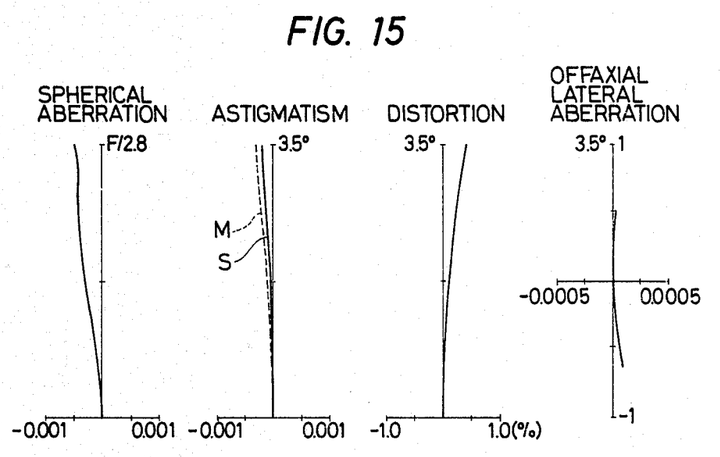
FIG. 15 is a curve diagram of respective aberrations in case the lens system is focused on an object at such distance that the magnification may be 1/30 by moving the entire lens system in the second embodiment.
Figure 16:
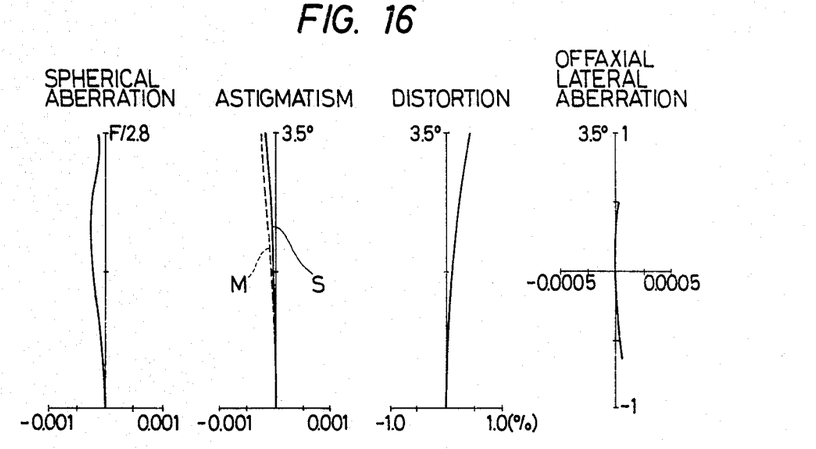
FIG. 16 is a curve diagram of respective aberrations in case the lens system is focused on an object at such distance that the magnification may be 1/30 by non-linearly varying one airspace in the lens system in the second embodiment.
Figure 17:
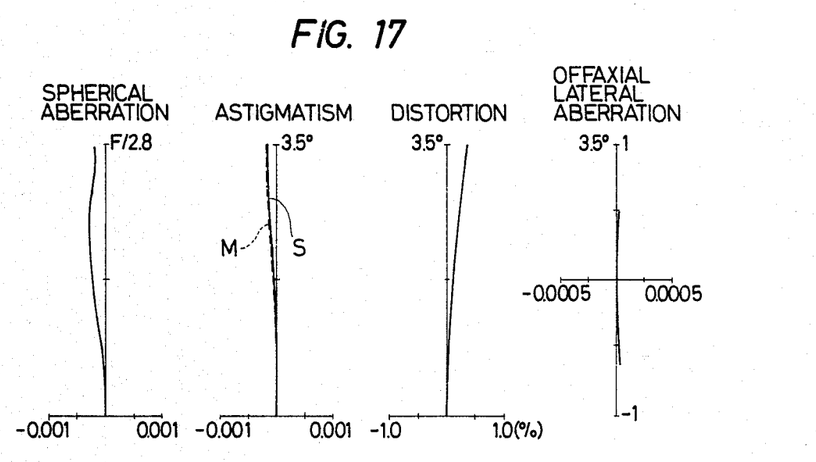
FIG. 17 is a curve diagram of respective aberrations in case the lens system is focused on an object at such distance that the magnification may be 1/30 by respectively non-linearly varying two airspaces in the lens system in the second embodiment.
Figure 18:
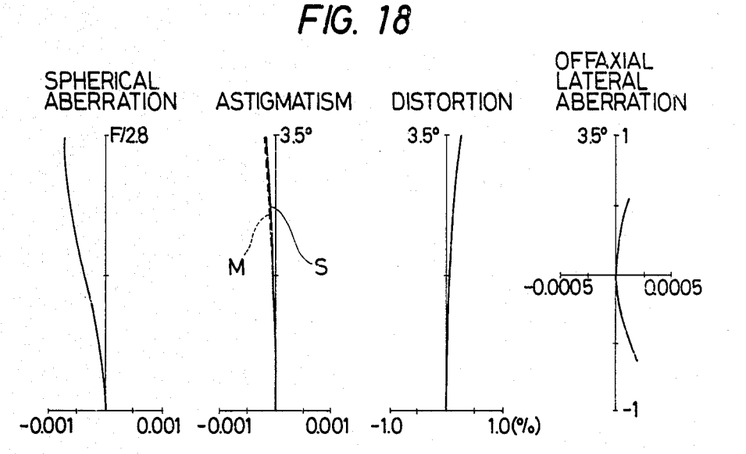
FIG. 18 is a curve diagram of respective aberrations in case the lens system is focused on an object at such distance that the magnification may be 1/10 by moving the entire lens system in the second embodiment.
Figure 19:
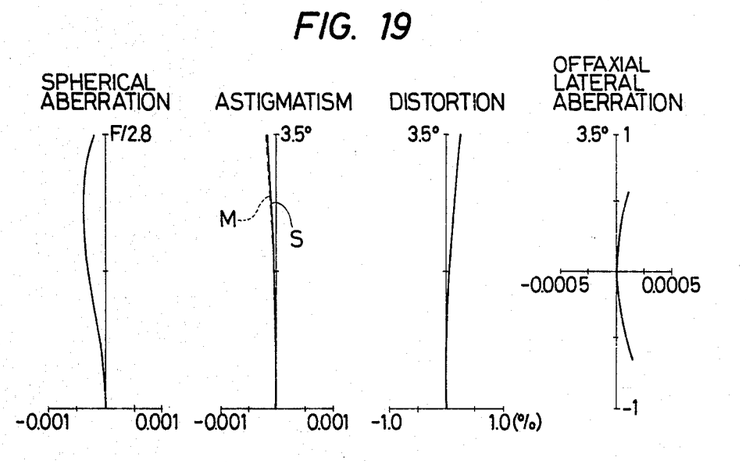
FIG. 19 is a curve diagram of respective aberrations in case the lens system is focused on an object at such distance that the magnification may be 1/10 by non-linearly varying one airspace in the lens system in the second embodiment.
Figure 20:
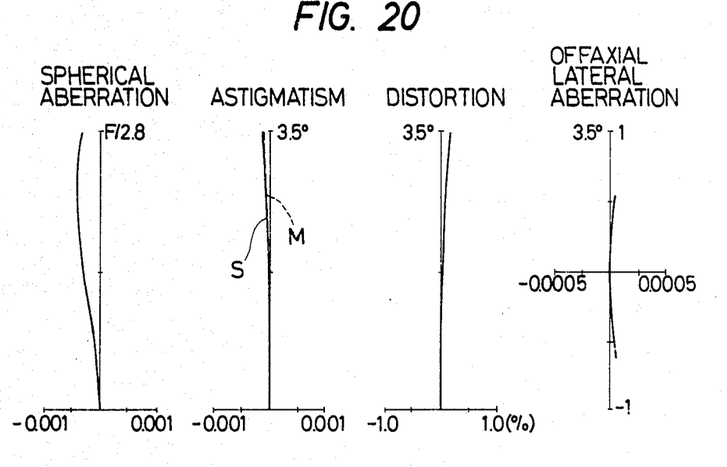
FIG. 20 is a curve diagram of respective aberrations in case the lens system is focused on an object at such distance that the magnification may be 1/10 by respectively non-linearly varying two airspaces in the lens system in the second embodiment.
Figure 21:
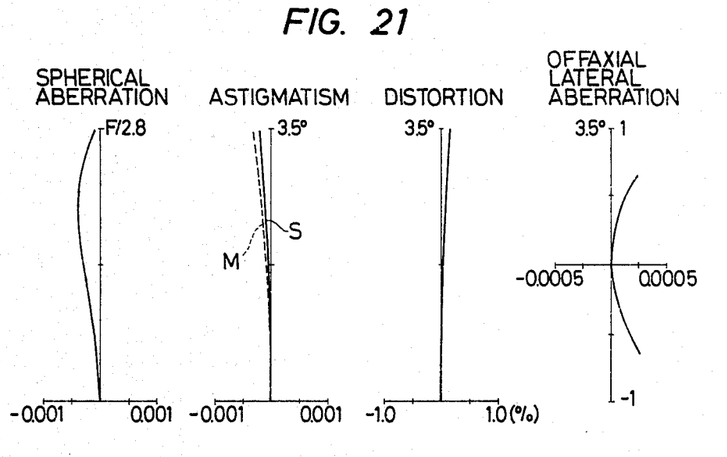
FIG. 21 is a curve diagram of respective aberrations in case the lens system is focused on an object at such distance that the magnification may be 1/5 by moving the entire lens system in the second embodiment.
Figure 22:
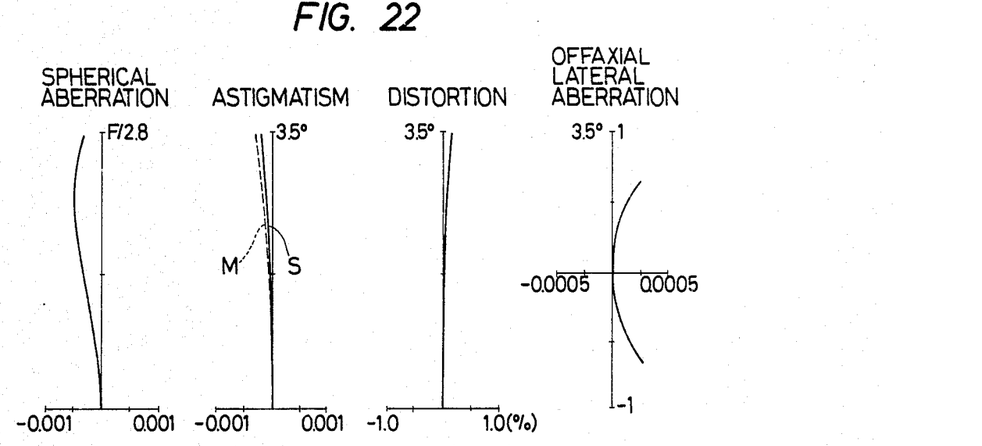
FIG. 22 is a curve diagram of respective aberrations in case the lens system is focused on an object at such distance that the magnification may be 1/5 by non-linearly varying one airspace in the lens system in the second embodiment.
Figure 23:
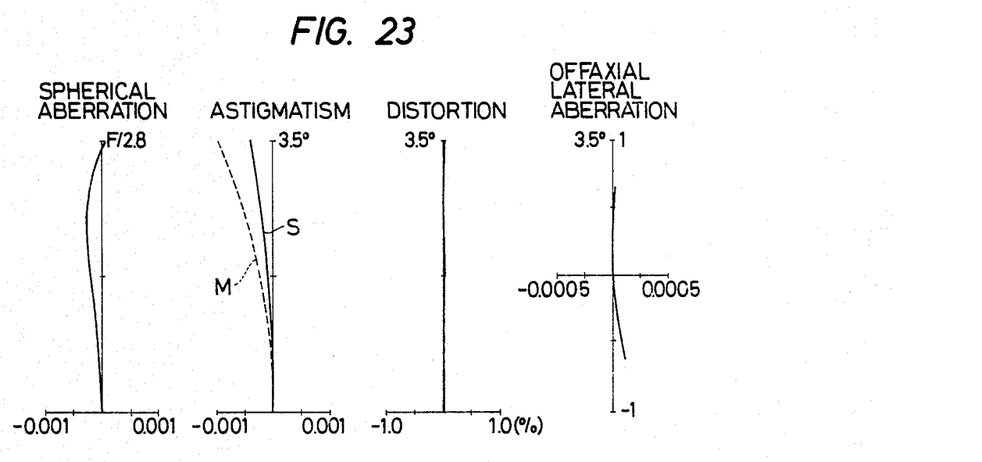
FIG. 23 is a curve diagram of respective aberrations in case the lens system is focused on an object at such distance that the magnification may be 1/5 by respectively non-linearly varying two airspaces in the lens system in the second embodiment.

FIGS. 14 through 23 are curve diagrams of aberrations of the above mentioned lens systems. FIG. 14 shows a spherical aberration, astigmatism and distortion in case the lens was focused at an infinite distance. FIGS. 15, 16 and 17 show the respective cases at a magnification of 1/30 that the lens was focused by paying out the entire lens system, that the aberrations were corrected by non-linearly varying the airspace $d_6$ and that the aberrations were corrected by non-linearly varying the airspaces $d_6$ and $d_8$. FIGS. 18, 19 and 20 show the respective cases at a magnification of 1/10 that the lens was focused by paying out the entire lens system, that the aberrations were corrected by non-linearly varying the airspace $d_6$ and that the aberrations were corrected by non-linearly varying the airspaces $d_6$ and $d_8$. FIGS. 21, 22 and 23 show the respective cases at a magnification of 1/5 that the lens was focused by paying out the entire lens system, that the aberrations were corrected by non-linearly varying the airspace $d_6$ and that the aberrations were corrected by non-linearly varying the airspaces $d_6$ and $d_8$. As in these diagrams, in the lens system of the telescopic type, the angle of field is so small that the change of the astigmatism is small and, in the near distance photographing, the spherical aberration and offaxial lateral aberration are problems. In this embodiment, only the airspace $d_6$ as varied non-linearly is shown. As clear from FIGS. 16, 19 and 22, at all the magnifications, the spherical aberrations are well corrected. However, at a magnification above 1/10, the offaxial lateral aberration is somewhat worse. On the other hand, in case two airspaces were varied non-linearly, as in FIGS. 17, 20 and 23, both spherical aberration and offaxial lateral aberration were corrected very well.

Figure 24:
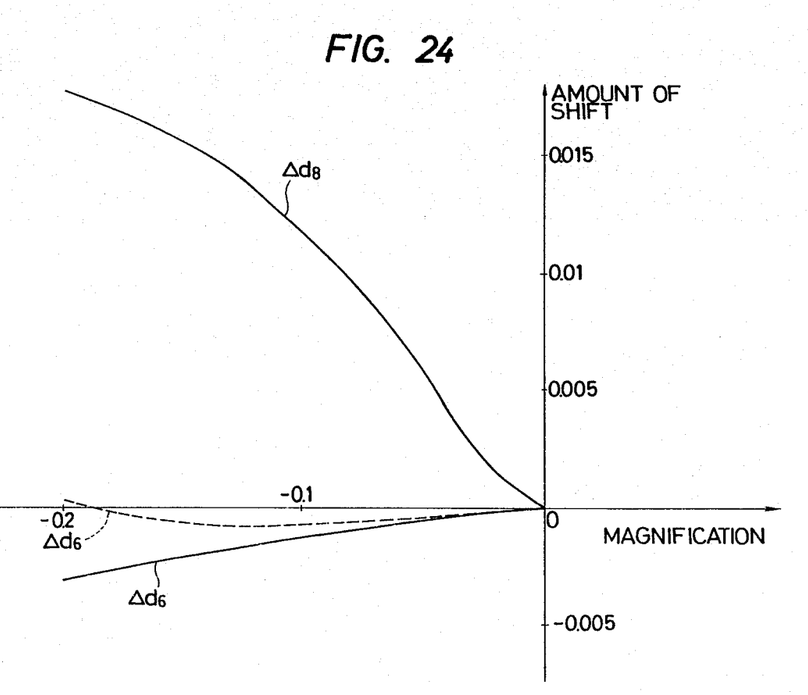
FIG. 24 is a view showing the amounts of variations of the airspace in the lens system of the second embodiment.

By the way, FIG. 24 shows the variation amounts of airspaces, the solid line being of the case that two airspaces were varied and the broken line being of the case that one airspace was varied.

As in the above, by non-linearly varying the airspace, the collapse of the aberrations unable to be corrected by the linear variation can be well corrected. Further, in case two airspaces are selected, the correction will be easier to make and will be able to be made better. The variation amount of the airspace can be freely non-linearly determined so that the results of various performance evaluations may be favorable. In such case, in order to obtain a favorable image in which respective aberrations are well balanced and corrected, it is preferable to vary the airspace so that the amount of the aberration to be corrected may fall under the following ranges:

$\frac{1}{2}A'' < A < A'$ (in the case of $A'' < A'$) and
$\frac{1}{2}A'' > A > A'$ (in the case of $A'' > A'$)
wherein the reference symbol A' denotes the value of the aberration at an infinite distance, A" denotes the value of the aberration in case the entire lens system is payed out and A denotes the value of the aberration as corrected.

We claim:
1. A lens system comprising a first lens unit having a positive refracting power as a whole, an aperture stop provided on the exit side of first lens unit and at least two units disposed on the exit side of said aperture stop comprising a second lens unit and a third lens unit, said lens system being movable along an optical axis as a whole for focusing and causing said second and third lens units to be further moved with the movement of the entire lens system so that airspace between said second lens unit and said aperture stop and between said second lens unit and said third lens unit are varied independently of each other and non-linearly to thereby prevent aberration from being deteriorated when said lens system is focused on a near distance object.

2. A lens system according to claim 1 wherein said airspaces are varied so that the amount of the aberration to be corrected falls under the following range:

$\frac{1}{2}A'' < A < A'$ (in the case of $A'' < A'$) and
$\frac{1}{2}A'' > A > A'$ (in the case of $A'' > A'$)

wherein the reference symbol $A'$ denotes the value of the aberration corresponding to the aberration to be corrected at an infinite distance, the reference symbol $A''$ denotes the value of the aberration corresponding to the aberration to be corrected in case the entire lens system is moved out and the reference symbol $A$ denotes the value of the aberration to be corrected.

3. A lens system according to claim 1 comprising a front lens group consisting of a first positive meniscus lens component having the convex surface on the object side, a second positive meniscus lens component having the convex surface on the object side, a third positive menicus lens component having the convex surface on the object side and a fourth negative meniscus lens component and a rear lens group consisitng of a fifth positive or negative cemented meniscus lens component having the convex surface on the image side and a sixth positive lens component, an airspace between said fourth lens component and fifth lens component and an airspace between said fifth lens component and sixth lens component being varied in focusing and having the following numerical data:

| $f = 1.0$ F/2.0 | | |
|---|---|---|
| $r_1 = 0.6477$ | | |
| $d_1 = 0.0780$ | $n_1 = 1.6170$ | $\nu_1 = 62.8$ |
| $r_2 = 3.2938$ | | |
| $d_2 = 0.0040$ | | |
| $r_3 = 0.4539$ | | |
| $d_3 = 0.0562$ | $n_2 = 1.4970$ | $\nu_2 = 81.6$ |
| $r_4 = 0.8860$ | | |
| $d_4 = 0.0064$ | | |
| $r_5 = 0.3857$ | | |
| $d_5 = 0.1116$ | $n_3 = 1.6425$ | $\nu_3 = 58.4$ |
| $r_6 = 0.4485$ | | |
| $d_6 = 0.0432$ | | |
| $r_7 = 0.7022$ | | |
| $d_7 = 0.0197$ | $n_4 = 1.7552$ | $\nu_4 = 27.5$ |
| $r_8 = 0.2314$ | | |
| $d_8 = 0.2243$ (variable) | | |
| $r_9 = -0.3745$ | | |
| $d_9 = 0.0495$ | $n_5 = 1.5814$ | $\nu_5 = 40.8$ |
| $r_{10} = 0.6167$ | | |
| $d_{10} = 0.0777$ | $n_6 = 1.7440$ | $\nu_6 = 44.7$ |
| $r_{11} = -0.5743$ | | |
| $d_{11} = 0.0062$ (variable) | | |
| $r_{12} = 1.8142$ | | |
| $d_{12} = 0.0417$ | $n_7 = 1.6970$ | $\nu_7 = 48.5$ |
| $r_{13} = -1.1928$ | | |

AMOUNTS OF VARIATIONS OF AIRSPACES

| Magnification | $\Delta d_8$ | $\Delta d_{11}$ |
|---|---|---|
| $\frac{1}{20}$ | 0.0150 | 0.0100 |
| $\frac{1}{5}$ | 0.0142 | 0.0262 |
| $\frac{1}{5}$ | 0.000 | 0.0700 | wherein the reference symbol f denotes a focal length of the entire lens system, the reference symbols $r_1$ through $r_{13}$ denote radii of curvature of the respective surfaces of the respective lens components, the reference symbols $d_1$ through $d_{12}$ denote thicknesses and airspaces of the respective lens components, the reference symbols $n_1$ through $n_7$ denote refractive indices of the respective lens components, and the reference symbols $\nu_1$ through $\nu_7$ denote Abbe's numbers of the respective lens components.

4. A lens system according to claim 1 comprising a front lens group consisting of a first positive lens component, a second negative lens component and a third positive lens component and a rear group consisting of a fourth negative lens component and a fifth positive lens component, an airspace between said third lens component and fourth lens component and an airspace between said fourth lens component and fifth lens component being varied in focusing and having the following numerical data:

| $f = 1.0$ F/2.8 | | |
|---|---|---|
| $r_1 = 0.4554$ | | |
| $d_1 = 0.0648$ | $n_1 = 1.4970$ | $\nu_1 = 81.6$ |
| $r_2 = -0.8199$ | | |
| $d_2 = 0.0383$ | | |
| $r_3 = -0.6010$ | | |
| $d_3 = 0.0221$ | $n_2 = 1.7995$ | $\nu_2 = 42.2$ |
| $r_4 = 1.9918$ | | |
| $d_4 = 0.0094$ | | |
| $r_5 = 0.3461$ | | |
| $d_5 = 0.0530$ | $n_3 = 1.4970$ | $\nu_3 = 81.6$ |
| $r_6 = -2.1432$ | | |
| $d_6 = 0.2945$ (variable) | | |
| $r_7 = -0.2528$ | | |
| $d_7 = 0.0118$ | $n_4 = 1.4983$ | $\nu_4 = 65.0$ |
| $r_8 = 0.2091$ | | |
| $d_8 = 0.0471$ (variable) | | |
| $r_9 = 0.3721$ | | |
| $d_9 = 0.0177$ | $n_5 = 1.6141$ | $\nu_5 = 55.0$ |
| $r_{10} = -0.5505$ | | |

AMOUNTS OF VARIATIONS OF AIRSPACES
(when $d_6$ was non-linearly varied)

| Magnification | $\Delta d_6$ |
|---|---|
| $\frac{1}{30}$ | $-0.0004$ |
| $\frac{1}{10}$ | $-0.0007$ |
| $\frac{1}{5}$ | 0.0003 |

AMOUNTS OF VARIATIONS OF AIRASPACES (when $d_6$ and $d_8$ were non-linearly varied)

| Magnification | $\Delta d_6$ | $\Delta d_8$ |
|---|---|---|
| $\frac{1}{30}$ | $-0.0004$ | 0.0029 |
| $\frac{1}{1}$ | $-0.0012$ | 0.0118 |

-continued

| Magnification | $\Delta d_6$ | $\Delta d_8$ |
|---|---|---|
| $\frac{10}{1}$<br>$\frac{1}{5}$ | −0.0031 | 0.0177 | wherein the reference symbol f denotes the focal length of the entire lens system, the reference symbols $r_1$ through $r_{10}$ denote radii of curvature of the respective surfaces of the respective lens components, the reference symbols $d_1$ through $d_9$ denote thicknesses and airspaces of the respective lens components, the reference symbols $n_1$ through $n_5$ denote refractive indices of the respective lens components, and the reference symbols $\nu_1$ through $\nu_5$ denote abbe's numbers of the respective lens components.

* * * * *